(12) United States Patent
Yabo et al.

(10) Patent No.: US 8,670,373 B2
(45) Date of Patent: Mar. 11, 2014

(54) ELASTIC ACCESS SCHEME FOR TWO-WAY SATELLITE COMMUNICATION SYSTEMS

(75) Inventors: Amir Yabo, Ramat-Gan (IL); Rafi Heiman, Ramot-Hashavim (IL); Timor Blau, Ramat-Gan (IL); Isacc Ben Laish, Kfar Saba (IL); Moti Goldshtein, Hod-Hasharon (IL); Eli Shapira, Ramla (IL); Snir Brener, Petah-Tikva (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 658 days.

(21) Appl. No.: 12/773,237

(22) Filed: May 4, 2010

(65) Prior Publication Data
US 2010/0284325 A1   Nov. 11, 2010

Related U.S. Application Data

(60) Provisional application No. 61/259,508, filed on Nov. 9, 2009, provisional application No. 61/175,621, filed on May 5, 2009.

(51) Int. Cl.
*H04B 7/212* (2006.01)
(52) U.S. Cl.
USPC ............ 370/322; 370/437; 370/458; 370/462

(58) Field of Classification Search
None
See application file for complete search history.

(56) References Cited

U.S. PATENT DOCUMENTS

| | | | |
|---|---|---|---|
| 5,657,323 A * | 8/1997 | Jan et al. ................. | 370/252 |
| 2005/0052992 A1* | 3/2005 | Cloonan et al. ........... | 370/229 |
| 2008/0176577 A1* | 7/2008 | Bourlas et al. ............ | 455/454 |
| 2009/0016260 A1* | 1/2009 | Thesling ................... | 370/321 |

OTHER PUBLICATIONS

ETSI EN 301 790 v1.5. 1 (May 2009), Digital Video Broadcasting (DVB); Interaction channel for satellite distribution systems.

* cited by examiner

*Primary Examiner* — Andrew Chriss
*Assistant Examiner* — Salvador E Rivas
(74) *Attorney, Agent, or Firm* — Banner & Witcoff, Ltd.

(57) ABSTRACT

In a satellite communication system, comprising a hub, a satellite and plurality of remote terminals (e.g., VSATs), a method for allocating timeslots over a return channel to VSATs in real time, without a reference to a predefined time-frequency map, for at least the purpose of optimizing return channel utilization. Also presented are a method for dividing a return channel to transmission channels in real time, a method for determining a most suitable timeslot type for a VSAT per allocation period and a tiling algorithm for mapping allocated capacity onto return channel bandwidth.

28 Claims, 8 Drawing Sheets

402a

| VSAT ID | Approved Capacity | Slot Type |
|---|---|---|
| 110a | B1 | ST1 |
| 110b | B2 | ST2 |
| 110c | B3 | ST3 |
| 110d | B4 | ST4 |
| ... | ... | ... |

402b

| Slot Type ID | Modulation | Coding | Symbol Rate |
|---|---|---|---|
| ST1 | Modulation 1 | Coding 1 | SR 1 |
| ST2 | Modulation 2 | Coding 2 | SR 2 |
| ST3 | Modulation 3 | Coding 3 | SR 3 |
| ST4 | Modulation 4 | Coding 4 | SR 4 |
| ... | ... | ... | ... |

701

| MODCOD ID | Modulation | Coding | Spectral Eff. | Minimal SNR |
|---|---|---|---|---|
| MODCOD 1 | Modulation 1 | Coding 1 | 0.9 | 5 |
| MODCOD 2 | Modulation 2 | Coding 2 | 1.5 | 12 |
| MODCOD 3 | Modulation 3 | Coding 3 | 1.3 | 7 |
| MODCOD 4 | Modulation 4 | Coding 4 | 1.4 | 11 |
| ... | ... | ... | ... | ... |

702

| MODCOD ID | Modulation | Coding | Spectral Eff. | Minimal SNR | Power Ratio | Capacity Ratio | Power/Capacity |
|---|---|---|---|---|---|---|---|
| MODCOD 2 | Modulation 2 | Coding 2 | 1.5 | 12 | 0.851 | 0.933 | 0.912 |
| MODCOD 4 | Modulation 4 | Coding 4 | 1.4 | 11 | 0.429 | 0.929 | 0.462 |
| MODCOD 3 | Modulation 3 | Coding 3 | 1.3 | 7 | 0.911 | 0.692 | 1.316 |
| MODCOD 1 | Modulation 1 | Coding 1 | 0.9 | 5 | --- | --- | --- |
| ... | ... | ... | ... | ... | ... | ... | ... |

703

| MODCOD ID | Power/Capacity |
|---|---|
| MODCOD 4 | 0.462 |
| MODCOD 2 | 0.912 |
| MODCOD 3 | 1.316 |
| MODCOD 1 | --- |
| ... | ... |

Fig. 7

ELASTIC ACCESS SCHEME FOR TWO-WAY SATELLITE COMMUNICATION SYSTEMS

RELATED APPLICATIONS

The present application is a non-provisional of U.S. Provisional Application Ser. No. 61/175,621, filed May 5, 2009, and is a non-provisional of U.S. Provisional Application Ser. No. 61/259,508, filed Nov. 9, 2009, both of which are entitled "Elastic Access Scheme For Two-Way Satellite Communication System." The contents of both provisional applications are incorporated herein by reference in their entirety for all purposes.

FIELD OF THE INVENTION

This invention is related to satellite communication systems. In particular, it pertains to the return channel access scheme of star and/or mesh two-way satellite communications systems, wherein the access scheme is based on Multi-Frequency Time-Division Multiple Access (MF-TDMA) and reservation methods.

BACKGROUND

In a two-way satellite communication system, comprised of a hub and plurality of remote terminals (e.g., very small aperture terminals (VSATs)), information from VSATs may be transmitted towards the hub (and in case of mesh topology between VSATs as well) over shared bandwidth resource, known as return channel. The return channel may further comprise one or more transmission channels at one or more symbol rates (i.e. transmission speeds). Each transmission channel may occupy at least a portion of the return channel bandwidth without overlapping any of the other transmission channels. Furthermore, each transmission channel may be further divided in the time domain to one or more timeslots, wherein each timeslot may be used for transmitting a single data burst. In addition, in some embodiments of such satellite communication system, said timeslots may be configured for transmission of data bursts using one or more modulation and (forward error correction) coding combinations.

In such satellite communication system, use of the return channel may be governed by an access scheme, i.e. a method according to which each VSAT may determine, either on its own or through receiving allocation information from the hub, one or more timeslots over one or more transmission channels for transmitting information. Such access scheme, which may allow multiplexing of VSAT transmissions over both frequency and time, is often referred to as Multiple Frequency Time Division Multiple Access (MF-TDMA).

In many embodiments of MF-TDMA access schemes, a predefined time-frequency map may be known both to the hub and to the VSATs. In some embodiments, such as Digital Video Broadcasting-Return Channel via Satellite (DVB-RCS) (EN 301 790), the hub may distribute the predefined time-frequency map to VSATs over the forward channel (which may be a statistically multiplexed channel for transmitting information from the hub to the VSATs). In other embodiments, the time-frequency map may be calculated by a hub and by VSATs separately based on configuration parameters (which may be programmed into the hub and the VSATs during installation or thereafter).

Since time is endless but computation and memory resources are finite, the time-frequency map may describe the return channel composition (e.g. in terms of transmission channels and timeslots) for a limited period of time, whereas the same return channel composition pattern may be endlessly repeated. In addition, a VSAT may select one or more timeslots and/or the hub may allocate one or more timeslots to a VSAT (for at least the purpose of transmitting one or more data bursts) with reference to a time-frequency map, i.e. on one or more predefined transmission channels and at one or more predefined timeslots.

In some embodiments, the MF-TDMA access scheme is combined with a reservation technique, i.e. a VSAT may use only those timeslots which may be allocated to it by the hub. In order to receive such allocation, a VSAT may send a capacity request to the hub over a signaling channel (e.g. dedicated timeslots, which a VSAT may be allocated at fixed intervals, or shared timeslots which one or more VSATs may utilize in a contention manner, for at least this purpose). In such embodiments, a method at the hub for allocating timeslots to a VSAT may include a step of considering the transmission capabilities of the VSAT (e.g. in terms of transmission power) and its current link conditions (e.g. fade conditions). Such step may be necessary for allocating timeslots of appropriate symbol rate, modulation and coding characteristics, at least for the purpose of ensuring at an applicable destination, be it the hub or another VSAT in case of mesh connectivity, appropriate reception conditions for a burst transmitted by the VSAT.

However, due to time-frequency map limitations, such as map distribution intervals (which are often quite long in order to minimize bandwidth usage for this purpose over the forward channel) and predetermined timeslot characteristics, existing allocation methods lack dynamic versatility (either the time-frequency map never changes, or changes are rare due to the relatively long intervals required for gathering sufficient statistics regarding return channel usage and adjusting the time-frequency map accordingly). Such methods do not allow rapid changes and/or adaptation in real time (i.e. at the time of allocating bandwidth to VSATs) to changing satellite link conditions, either at the hub side or at the VSATs side. This often results in far from optimal use of space segment resources and consequently in either increase of network operational costs (due to needing more space segment) or in degraded service.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In a satellite communication system, comprising a hub, a satellite and plurality of remote terminals (e.g., VSATs), the VSATs may be configured to transmit information towards the hub (and/or towards other VSATs in mesh topology) over a shared return channel. The return channel may be divided into one or more transmission channels and each transmission channel may be further divided in the time domain to one or more timeslots.

In one aspect of this invention, a method for allocating timeslots over a return channel to VSATs in real time, without a reference to a predefined time-frequency map and over an allocation period, is presented. This method may be used for at least the purpose of optimizing return channel utilization over persistently changing conditions and usage profiles.

In another aspect of this invention, the division of a return channel to transmission channels is determined in real time through linear combination of predefined basic symbol rates. This division may be determined on a per timeslot basis at least for the purpose of allowing a most efficient timeslot type to be used for every burst.

In yet another aspect of this invention, a method for determining a most suitable timeslot type for a VSAT per allocation period, is presented. Based on the capacity allocated to a VSAT during an allocation period and on the transmission capabilities of the VSAT, a most efficient timeslot type may be determined per an allocation period.

In a further aspect of this invention, a tiling algorithm for mapping allocated capacity onto return channel bandwidth over an allocation period is presented. The algorithm may be governed by three rules, which sufficiently define the behavior of the algorithm. The algorithm may be used for achieving appropriate and efficient mapping while requiring reasonable processing power.

In yet a further aspect of this invention, methods for determining the total capacity available for distribution based on the results of a mapping algorithm are presented. These methods may be used at least for the purposes of presenting a fairness behavior, preventing bandwidth starvation, minimizing allocation delay and monitoring changes in total network throughput.

In a further aspect of this invention, methods for allocating timeslots over a return channel to VSATs in real time, without a reference to a predefined time-frequency map, while monitoring and/or enforcing a predefined power over bandwidth (P/B) ratio, are also presented. These methods may be used at least for the purposes of preventing a satellite communication system from exceeding a total power limitation that may exist in regard to a return channel space segment.

BRIEF DESCRIPTION OF THE DRAWINGS

Figure 1:
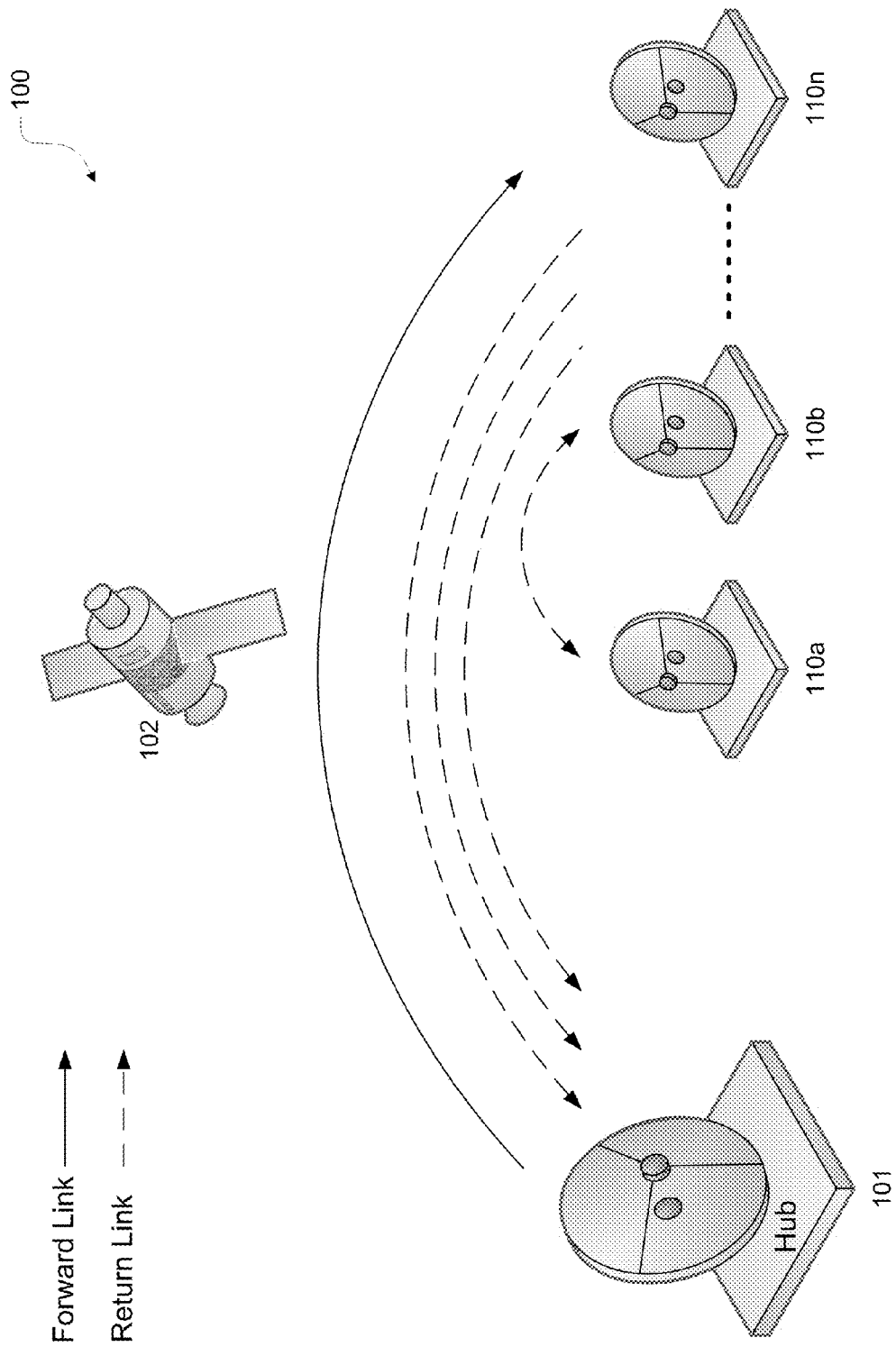

Having thus described the invention in general terms, reference will now be made to the accompanying drawings, which are not necessarily drawn to scale, and wherein:

FIG. 1 shows a star/mesh satellite communication system in accordance with certain aspects of the invention.

Figure 2:
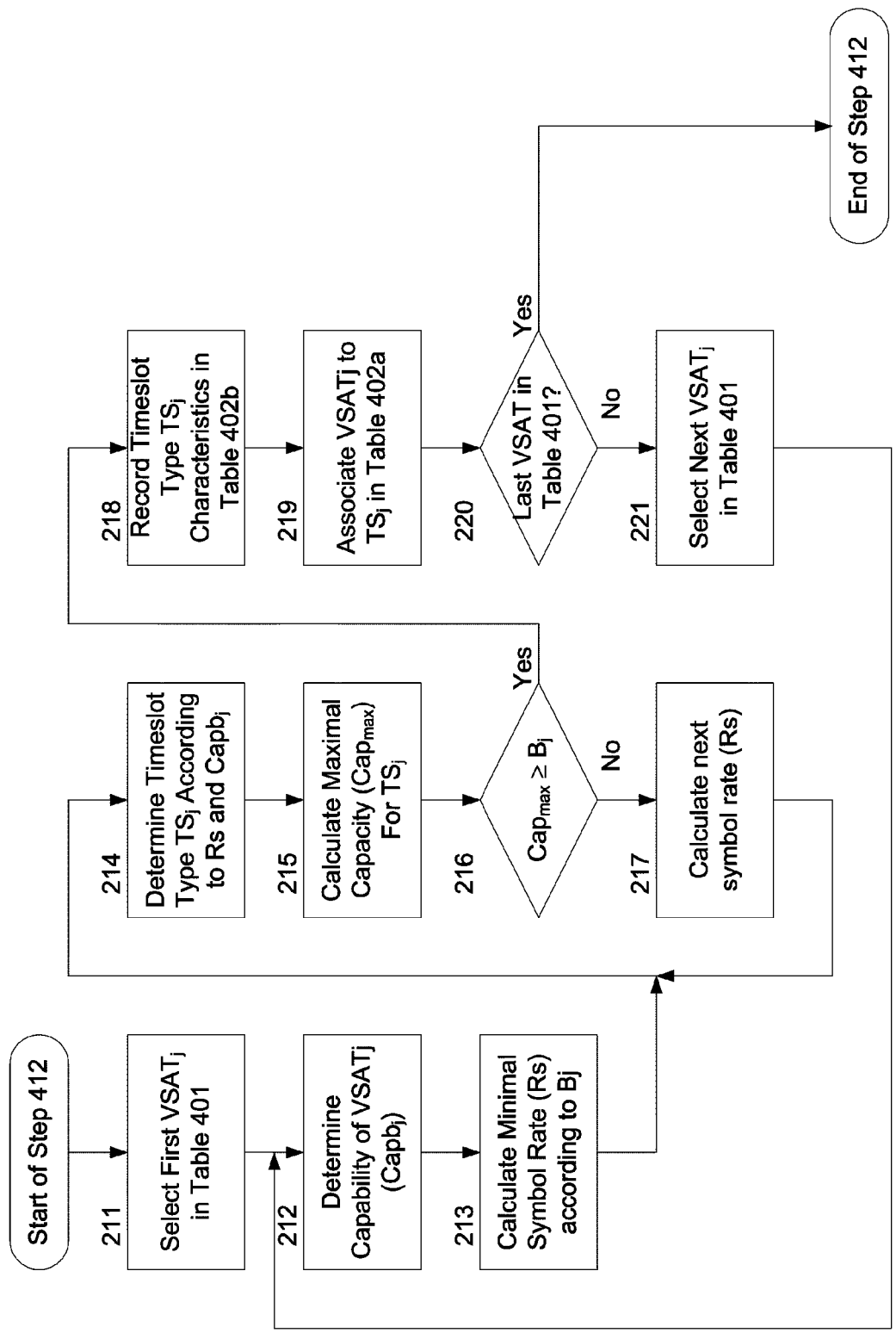

FIG. 2 shows a flow chart of an algorithm for determining a most suitable timeslot type in accordance with certain aspects of the invention.

Figure 3:
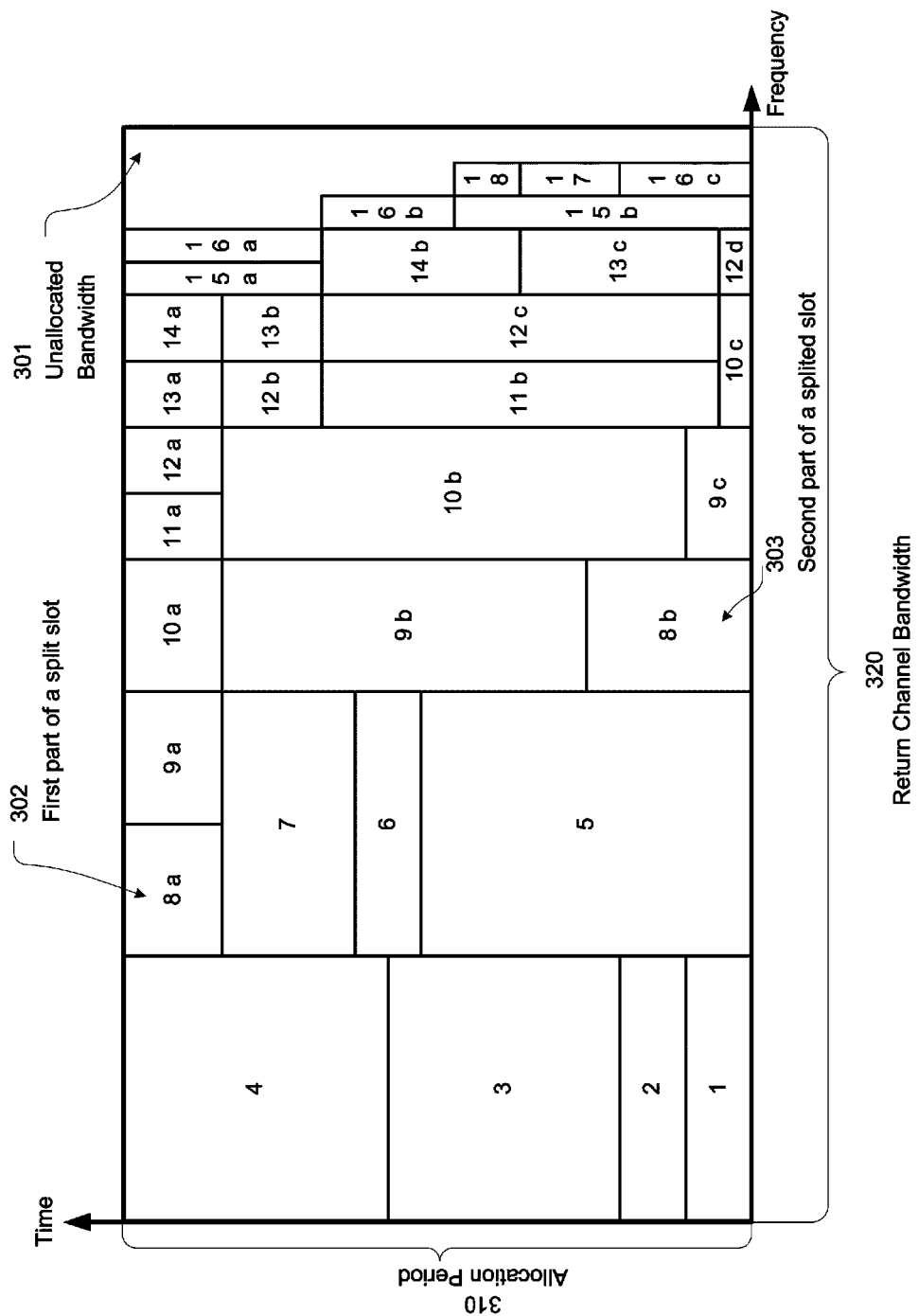

FIG. 3 shows a tiling example in accordance with certain aspects of the invention.

Figure 4:
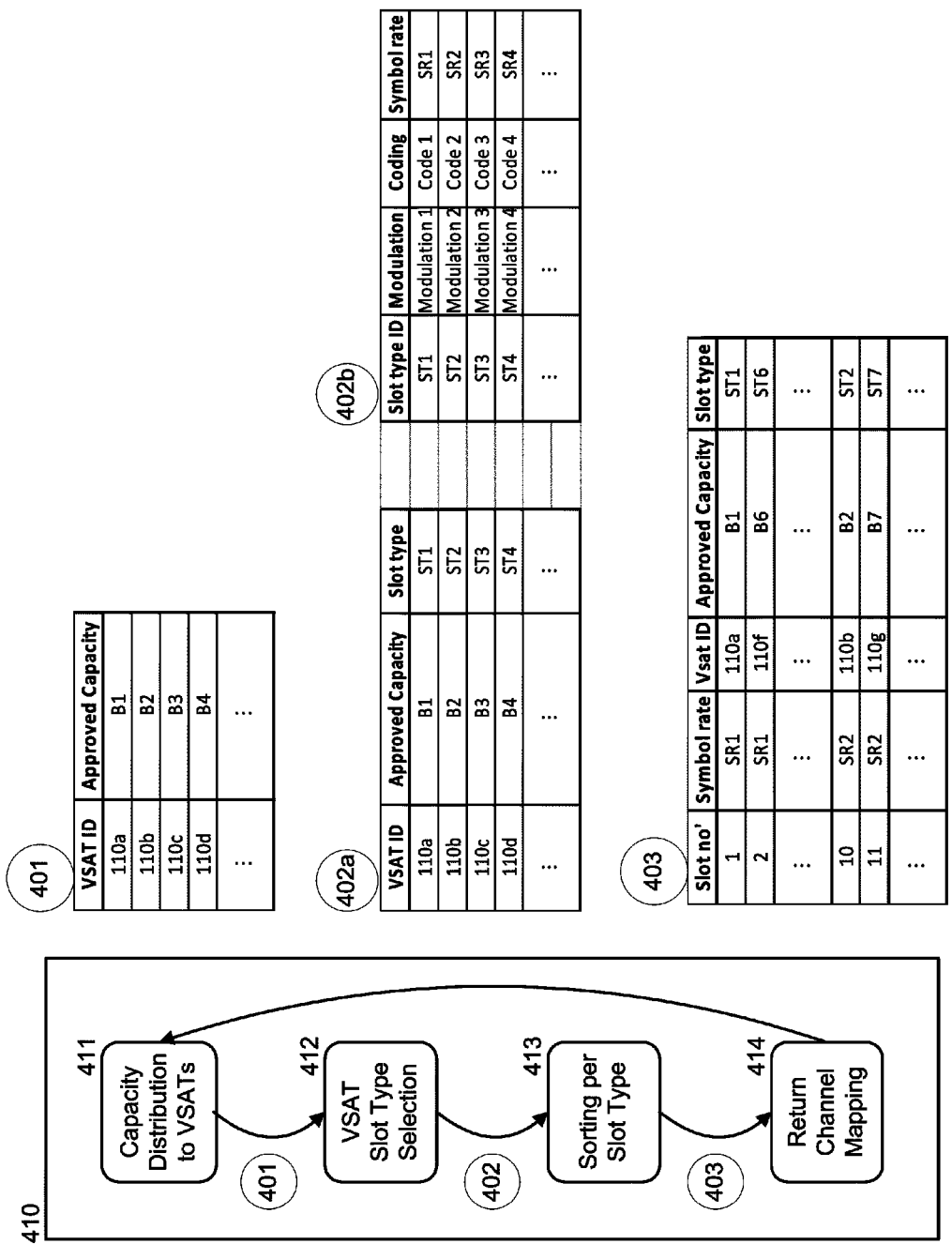

FIG. 4 shows a flow chart of a timeslot allocation algorithm in accordance with certain aspects of the invention.

Figure 5:
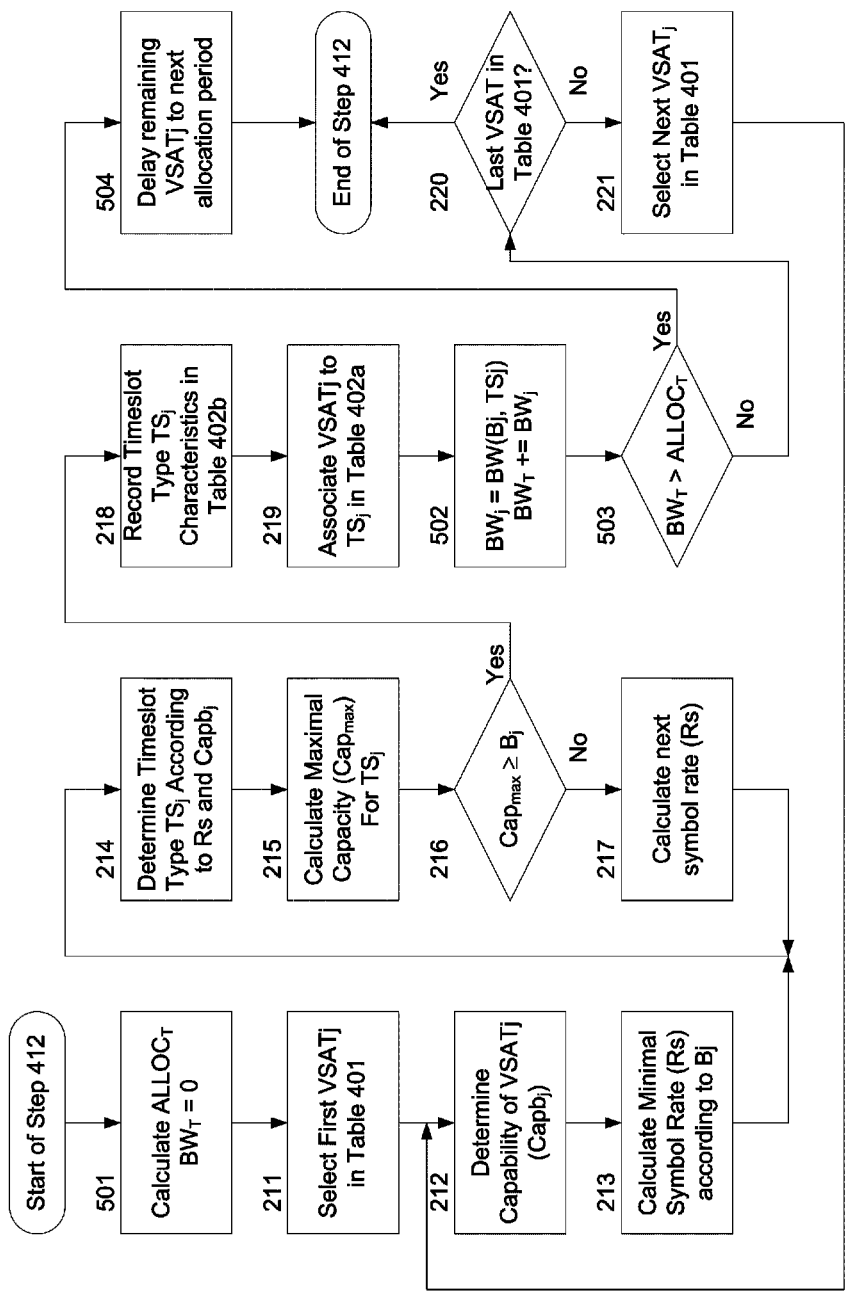

FIG. 5 shows a flow chart of an enhanced algorithm for determining a most suitable timeslot type in accordance with certain aspects of the invention.

Figure 6:
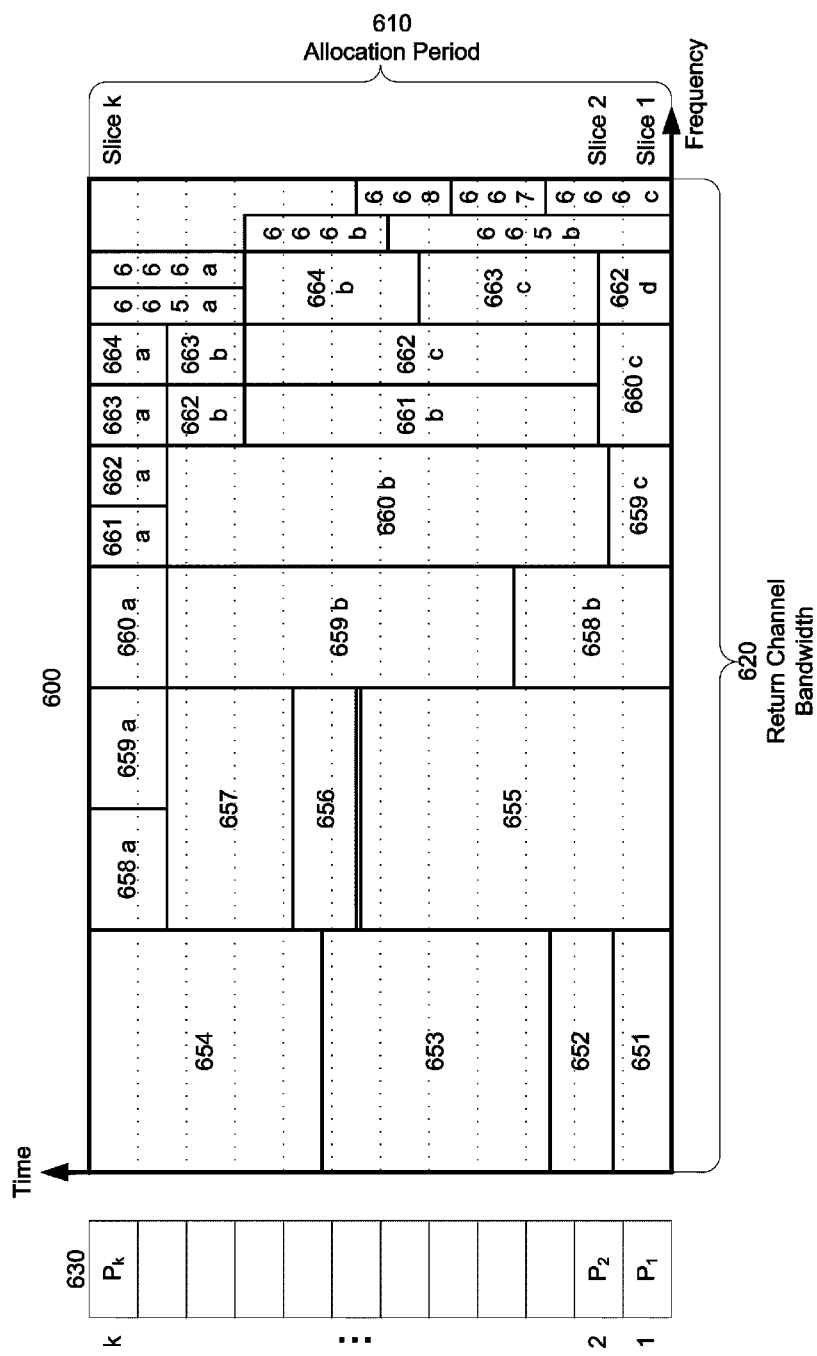

FIG. 6 shows an illustration of return channel bandwidth in accordance with certain aspects of the invention.

FIG. 7 shows modulation and coding tables in accordance with certain aspects of the invention.

Figure 8:
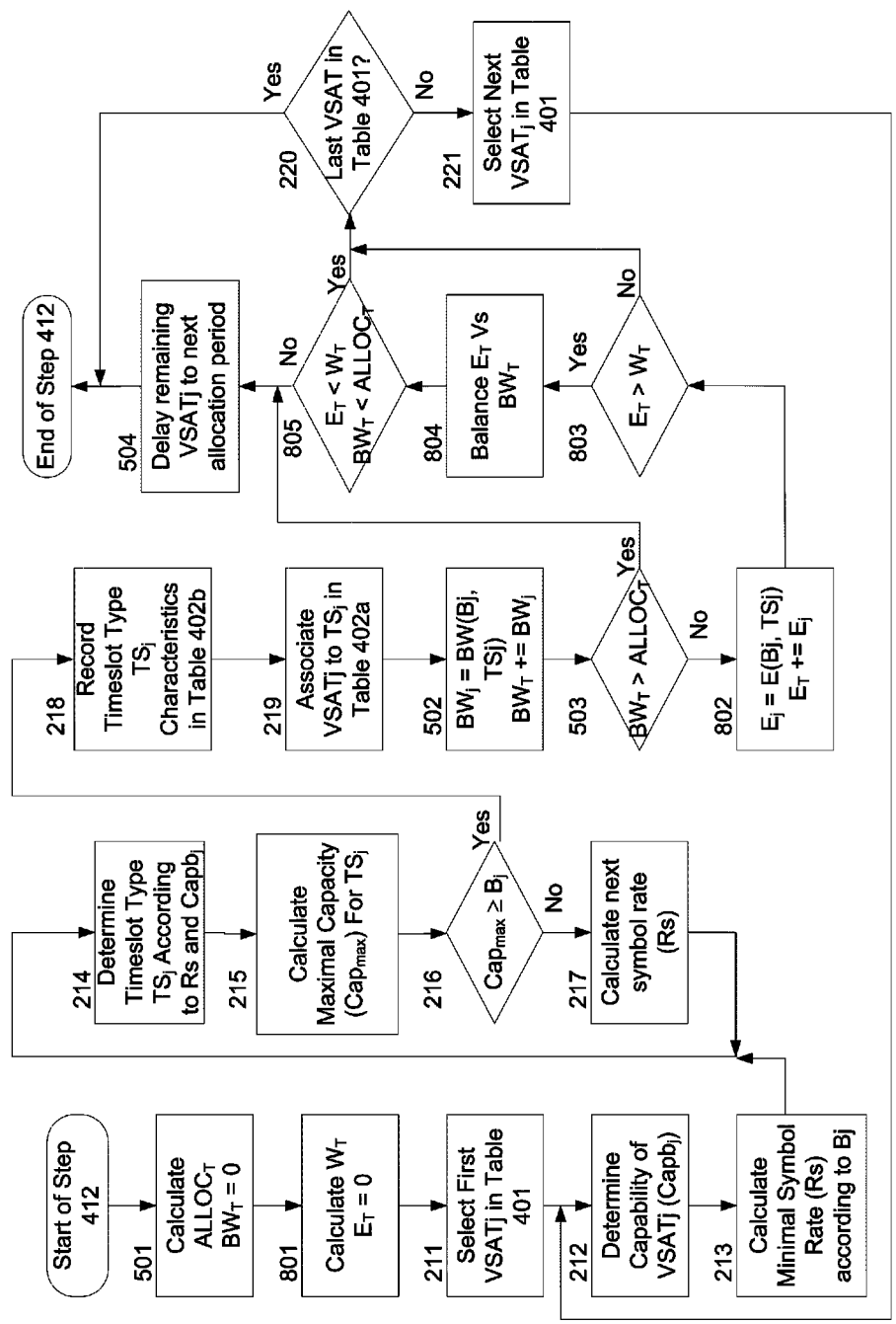

FIG. 8 shows a flow chart of a further enhanced algorithm for determining a most suitable timeslot type in accordance with certain aspects of the invention.

DETAILED DESCRIPTION

FIG. 1 shows a satellite communication system 100, which may comprise a hub 101, a satellite 102 and plurality of remote terminals (VSATs) 110a to 110n (referred to herein as VSATs 110). A VSAT is a well known term of art in the field of satellite communication, and is used throughout the present disclosure for convenience and ease of readability. However, it should be understood that the concepts described herein are not limited to VSATs, but may apply to other types of communication terminals not included within the well understood definition of VSAT. Accordingly, in the present disclosure, the term VSAT shall mean any communication terminal adaptable for use in a satellite communication system. Hub 101 may be configured to transmit a forward channel via satellite 102 towards VSATs 110. VSATs 110 may be configured to receive a forward channel and to transmit over a shared return channel towards hub 101 via satellite 102. Hub 101 may be further configured to receive a return channel. In mesh topology, VSATs 110 may be further configured to receive the return channel via satellite 102.

The return channel may be divided into one or more transmission channels at one or more symbol rates (i.e. transmission speeds). Each transmission channel may be further divided in the time domain to one or more timeslots, wherein each timeslot may be used for transmitting a single data burst. In addition, timeslots may be configured for transmission of data bursts using one or more modulation and coding combinations (e.g. Quaternary Phase-Shift Key QPSK 3/4, or Phase-Shift Key 8PSK 2/3, etc.).

In satellite communication system 100, hub 101 and VSATs 110 may be configured to employ a mechanism for VSAT transmission power control. VSAT 110 may be configured to repeatedly inform hub 101 of its transmission capabilities (i.e. a maximal reception level at the hub corresponding to the VSAT's maximal transmission power level) through a signaling channel within the return channel. Hub 101 may be configured to measure the reception level (e.g. C/N, $E_s/N_0$, $E_b/N_0$ or any other applicable measurement) of one or more bursts transmitted by VSAT 110 and send the measured values to VSAT 110 over the forward channel. VSAT 110 may be then further configured to modify its transmission power level on a burst-by-burst basis in accordance with changing satellite link conditions and/or in accordance with characteristics of each allocated timeslot (e.g. symbol rate, modulation and coding characteristics), at least for the purpose of insuring that bursts it transmits are properly received at hub 101 or at another VSAT in case of mesh topology. Furthermore, knowing the transmission capability of each VSAT at any given time, hub 101 may be configured to determine whether a VSAT may be capable of transmitting a particular timeslot type given the timeslot type characteristics, such as but not limited to a symbol rate characteristic, a modulation characteristic and a coding characteristic.

Furthermore, satellite communication system 100 may be configured to employ a reservation based MF-TDMA access scheme for the return channel. A VSAT 110 may transmit over any part of the return channel (i.e. on any of the transmission channels at any of the timeslots) only after that part may be assigned to VSAT 110 by hub 101. A VSAT 110 may be configured to use a signaling channel within the return channel in order to send capacity requests (e.g. for a required data volume and/or a required data rate) towards hub 101. In some embodiments, the hub may be configured to assign to a VSAT and/or a VSAT may be configured to be assigned a predefined capacity whenever the VSAT is logged on into the satellite network and/or otherwise establishes a communication link with the hub.

In addition, hub 101 may be configured to receive capacity requests from VSATs 110 or otherwise determine that capacity has to be assigned to one or more VSATs 110, allocate timeslots over the return channel against said requests or otherwise determined capacity demand, and distribute allocation information (e.g. frequency and timing parameters) to VSATs 110 over the forward channel. A VSAT 110 may be further configured to receive allocation information over the forward channel and to transmit bursts towards the hub (or towards another VSAT in case of mesh topology) in accordance with characteristics of a timeslot allocated to VSAT 110 by hub 101, whereas said characteristics may include at least a symbol rate characteristic, a modulation characteristic and a coding characteristic. For further reference herein, said characteristics may be referred to as determining a timeslot type, whereas two timeslots may be of a different type if they differ in at least one of the characteristics cited above or in any other characteristic.

In one aspect of this invention, FIG. 4 shows a flow chart of method 410 (also referred to herein as the allocation algorithm), comprised of steps 411 to 414, for allocating timeslots to VSATs in real time, without a reference to a predefined time-frequency map and over an allocation period. In certain embodiments, the allocation period may be a predefined interval, which on one hand may be long enough for allowing sufficient time for making the calculations comprising the allocation algorithm, and as short as possible on the other hand, for at least the purpose of allowing maximal flexibility and fastest response to VSATs needs and changing network conditions. In some embodiments of the invention, hub 101 of satellite communication system 100 may be configured to use method 410 for at least the purpose of optimizing return channel utilization through optimal timeslot type allocation for each VSAT 110 in accordance with its satellite link conditions, its transmission capability and its capacity requests.

In step 411, hub 101 may be configured to distribute the total capacity available during an allocation period against pending capacity requests from VSATs, and/or against otherwise determined capacity demand (e.g. a constant rate which a VSAT may be configured to be allocated whenever it may be logged on into the satellite network). The distribution algorithm itself may be based, at least in part, on applicable quality of service (QoS) methods, for at least the purpose of enforcing priority and/or insuring fairness between VSATs and/or between capacity requests. The output of this step may be table 401, which may include ids of VSATs that may have been distributed capacity during step 411 and the corresponding approved capacity ($B_a$) per each such VSAT. The approved capacity may be represented in bytes, kilobytes, ATM cells, MPEG frames or any other suitable data unit.

FIG. 2 shows a flow chart corresponding to step 412 in FIG. 4. In step 412, hub 101 may be configured to determine a most suitable timeslot type for each entry in table 401, i.e. for each VSAT, which may have been distributed capacity within an allocation period. Hub 101 may be configured to determine a transmission capability of a VSAT 110 and a minimal symbol rate corresponding to the capacity approved in step 411 ($B_j$), and to use both in order to determine the most efficient timeslot type for said VSAT during said allocation period.

After selecting an entry from table 401 (either the first entry at step 211 or a next entry at step 221 until all entries are handled), hub 101 may be configured to determine the capabilities of $VSAT_j$ denoted in the selected entry (step 212). As previously described, a VSAT 110 may be configured to repeatedly inform hub 101 of its transmission capabilities (i.e. its maximal transmission power level) through a signaling channel within the return channel. At step 212, hub 101 may be configured to poll this information and determine the current capabilities of the selected VSAT ($Capb_j$).

In satellite communication system 100, hub 101 may be configured to use a predefined set of symbol rates, comprising one or more symbol rates ($Rs_1$ to $Rs_n$), at least for the purpose of determining a symbol rate for an allocated timeslot through linear combination of said predefined symbol rates ($\Sigma a_j * Rs_j$, where $a_j$ is an integer number for every j between 1 and n) and in accordance with symbol rates that a VSAT 110 may be configured to transmit. In an example embodiment, a predefined set of symbol rates may include a single symbol rate (e.g. 64 Ksps) and the linear combination coefficients may be powers of 2 (hence allowing allocation of timeslots at 64, 128, 256, 512 Ksps and so on).

In step 213, hub 101 may be configured to determine a minimal symbol rate (Rs) in accordance with the approved capacity ($B_j$) allocated to $VSAT_j$ in step 411 and also listed in the selected entry of table 401. Hub 101 may be configured to determine a symbol rate for $VSAT_j$ based on the approved capacity ($B_j$), which may be the minimal symbol rate required for transmitting the approved capacity ($B_j$) using at least the most efficient modulation characteristic and coding characteristic (timeslot type) that $VSAT_j$ may be configured to transmit given no transmission capability limitations. Hub 101 may then round up the calculated symbol rate to the lowest symbol rate, which may be derived from the predefined set of symbol rates in accordance with symbol rates that $VSAT_j$ may be configured to transmit, in order to obtain the minimal symbol rate (Rs).

In step 214, hub 101 may be configured to determine a timeslot type ($TS_j$) corresponding to the capability of $VSAT_j$ ($Capb_j$, as determined in step 212) and a calculated symbol rate (i.e. at least modulation and coding characteristics in addition to the given calculated symbol rate). For each entry of the table, the first time this step is performed the calculated symbol rate (Rs) may be the minimal symbol rate, as calculated in step 213.

In step 215, hub 101 may be configured to calculate a maximal capacity ($Cap_{max}$) that may be transmitted by $VSAT_j$ during an allocation period using the timeslot type determined in step 214 ($TS_j$). Hub 101 may then compare said maximal capacity ($Cap_{max}$) with the approved capacity for $VSAT_j$ ($B_j$), as listed in table 401 (step 216). If the calculated maximal capacity equals or exceeds the approved capacity ($B_j$), the determined timeslot type may be the most suitable timeslot type for $VSAT_j$. The hub may then be configured (step 218) to record the characteristics of this timeslot type in table 402b (at least a symbol rate characteristic, a modulation characteristic and a coding characteristic) and to associate $VSAT_j$ with said timeslot type in table 402a (step 219), which may be derived from table 401 by adding a timeslot type property to each entry. On the other hand, if the approved capacity for $VSAT_j$ ($B_j$) exceeds the calculated maximal capacity ($Cap_{max}$), hub 101 may be configured (step 217) to select a new symbol rate (using said predefined set of symbol rates as previously described) and to repeat steps 214 to 216 until the calculated maximal capacity ($Cap_{max}$) equals or exceeds the approved capacity ($B_j$). In some embodiments, the newly selected symbol rate may be the minimal symbol rate that may be derived from said predefined set of symbol rates, which is still higher than the previously selected symbol rate.

Again in reference to FIG. 4, in step 413, hub 101 may be configured to sort table 402b in accordance to the symbol rate characteristic in a descending order, so that a timeslot type with a highest symbol rate may occupy the first entry in the resulting table. Where there may be several timeslot types with the same symbol rate characteristic, hub 101 may be configured to perform a secondary sort in accordance to a timeslot efficiency characteristic, which may be calculated based on at least a modulation characteristic and a coding characteristic, which may be listed in table 402b.

Once table 402b is sorted, hub 101 may be configured to sort table 402a in accordance with the order in the sorted table 402b. The result may be placed in table 403, which may list ids of VSATs and respective approved capacities in accordance to a descending primary and secondary orders of symbol rate and timeslot efficiency respectively, as per the timeslot type, which may have been determined for each VSAT in step 412.

In another aspect of this invention and in reference to step 414 of FIG. 4, hub 101 may be configured to map (allocate) the capacity distributed to each VSAT, in accordance with a corresponding timeslot type selected for each VSAT, onto the return channel bandwidth using a tiling algorithm as described herein. FIG. 3 shows an example of such tiling for 18 allocation entries (numbered 1 to 18) over return channel bandwidth 320 and allocation period 310. Area 301 represents capacity within an allocation period, which may remain unallocated if the total capacity requested is lower than the total capacity available.

Furthermore, prior to tiling, for each VSAT the distributed capacity may be fitted into actual timeslot instances corresponding to the selected timeslot type. In some embodiments of the invention, the distributed capacity for a VSAT may be fitted into one or more, fixed length or variable length, timeslots. In other embodiments of the invention, the distributed capacity for a VSAT may be fitted into a single timeslot, which may be split into two or more fragments only if the tiling algorithm mandates it, as shown in FIG. 3 and described herein. To illustrate certain possible embodiments, consider an illustrative VSAT that may be approved to transmit 1 kilobyte (KB) of data. When preparing for a data transmission, the approved capacity (e.g., 1 KB) of the VSAT may be fit into one or more timeslot instances that correspond to the timeslot type associated with the VSAT. In certain examples, all timeslots may be of a fixed length (e.g., 192 bytes), regardless of the approved transmission capacity for the VSAT or how much the VSAT needs to transmit. In such embodiments, a number of uniform timeslots sufficient to transmit the entire transmission from the VSAT may be designated, each timeslot having the same predetermined fixed length. In these examples, it may be observed that the last timeslot instance might not be completely filled with actual data if the volume of data to be transmitted is not evenly divisible by the fixed timeslot length. Therefore, in these examples, different VSATs may use the same uniform length of timeslots for their transmissions. In other examples, the entire approved transmission capacity for a VSAT (e.g., 1 KB) may be fit into a single timeslot. In these examples, since the timeslot length for one VSAT might be dependent on the approved capacity for that VSAT, then timeslot lengths might vary from one VSAT to another. Note that in these examples, the timeslot length might still be limited by an allocation period.

Hub 101 may be configured to allocate return channel bandwidth to VSATs in accordance with table 403 in general and the order of entries in table 403 in particular, starting at the first entry and sequentially going over all entries. With reference to FIG. 3, the 18 entries shown in that example may be allocated in accordance to their numerical order, i.e. from 1 to 18. For each entry in table 403, hub 101 may tile (allocate) the approved capacity in accordance with the characteristics of the selected timeslot type at the first available space within the return channel. Starting at the lowest frequency of the return channel and at the start time of the allocation period (as shown in FIG. 3), the first available space at any given time may be an unallocated space having the lowest frequency and then the earliest time within the allocation period. It may be appreciated by anyone skilled in the art, that having the first available space starting at the highest frequency of the return channel and/or at the end time of the allocation period, including any applicable adjustments compensating for the change in tiling direction, is merely another variation of the tiling algorithm described herein.

In accordance with one aspect of the tiling algorithm, hub 101 may be configured to follow a first tiling rule. The hub may tile (allocate) a second timeslot (at a first available space) within the same frequency range (start and stop frequencies) of an already tiled first timeslot, only if the start and stop frequencies of said second timeslot are both within the frequency range of said first timeslot. As shown in FIG. 3, hub 101 may tile two or more timeslots within the frequency range of an already tiled timeslot, such as timeslots 8a and 9a, which are fitted in the same frequency range as timeslots 5, 6 and 7, which may be tiled prior to tiling timeslots 8a and 9a. Another similar example may be timeslots 11a and 12a, which may be tiled within the frequency range of timeslots 9c and 10b, which may be tiled before timeslots 11a and 12a.

In accordance with another aspect of the tiling algorithm, hub 101 may be configured to follow a second tiling rule. Hub 101 may tile a timeslot at a first available space and in accordance with the first tiling rule only if the end time of the timeslot does not exceed the end time of the allocation period. If an entire timeslot may not be fitted at a first available space due to exceeding the allocation period end time, hub 101 may be configured to split the timeslot into two fragments (timeslots), one fitting the first available space and the other containing the rest of the original timeslot's capacity. Hub 101 may be further configured to tile a first fragment timeslot at a first available space and repeat the tiling procedure with the remaining timeslot fragment while considering the next first available space.

In accordance with another aspect of the tiling algorithm, hub 101 may be configured to follow a third tiling rule. Hub 101 may consider VSAT transmitter limitations and determine one or more intervals and/or one or more frequency ranges, in which a VSAT may not be able to transmit a timeslot to be tiled. In some embodiments of the invention, hub 101 may be configured to consider VSAT transmission limitations such as but not limited to a maximal number of signals a VSAT may be configured to simultaneously transmit and/or a minimal interval a VSAT may require for changing transmission frequency and/or any other limitation. In mesh topology, hub 101 may further consider receiver limitations and determine one or more intervals and/or one or more frequency ranges, in which a receiving VSAT may not be able to receive a timeslot to be tiled.

Furthermore, hub 101 may be configured not to tile a timeslot for a VSAT at a first available space within the return channel, even if said first available space and the characteristics of the timeslot to be tiled conform to the first tiling rule, if said first available space overlaps any of the intervals and/or frequency ranges determined by hub 101 for said VSAT as invalid for transmitting a timeslot and/or receiving a timeslot in case of mesh topology. For example, if a VSAT is configured to transmit a single signal at any given time, the third tiling rule may prevent hub 101 from tiling two or more timeslots for said VSAT with any overlap in time between them.

Furthermore, once a conflict between a first available space and transmission limitations and/or reception limitations may be detected, hub 101 may determine whether the conflict affects the entire first available space or only a suffix of it (i.e. in the time domain). If an entire first available space is in conflict with said transmission and/or reception limitations, hub 101 may tile a timeslot for a VSAT at the nearest available space within the return channel. In certain embodiments, a nearest available space may be at the earliest unallocated interval within a following frequency range, which conforms to the tiling rules. However, if the conflict affects only a suffix of a first available space, hub 101 may regard the start of the conflict interval in a manner similar to an end of an allocation period and split a timeslot to be tiled into two fragments, as previously described in reference to the second tiling rule.

Again in reference to FIG. 3, the duration of a timeslot 8 may be longer than the interval between the end time of timeslot 7 and the end time of allocation period 310. As that may be a first available space after tiling timeslot 7 and since this first available space may conform to the first and third tiling rules, hub 101 may split timeslot 8 in accordance with the second tiling rule to a first part timeslot 8a (302) and a second part timeslot 8b (303), and tile timeslot 8a at the first available space, i.e. immediately following timeslot 7. At this point, the next available space may be the remaining space between timeslot 7 and the end of the shown allocation period. However, although timeslot 8b or part of it may fit the first available space (in accordance with the first tiling rule), this space of the return channel may be no longer valid for said VSAT as it may be configured to transmit only a single signal at any given time. Therefore, in accordance with the third tiling rule and since the entire first available space is in conflict with VSAT transmission limitations, hub 101 may tile timeslot 8b at the earliest time within the following frequency range (i.e. at the nearest available space).

In another example of said tiling algorithm, after timeslot 8 may be tiled (in two parts), the first available space is following timeslot 7 and in parallel to timeslot 8a. Though timeslot 9 may fit the first available space in accordance with the first and third tiling rules, due to its duration hub 101 may split it in accordance with the second tiling rule and tile fragment 9a at the first available space. At this point, the next available space is following timeslot 8b, with the time interval in parallel to timeslot 9a being invalid as the applicable VSAT may be configured to transmit only a single signal at any given time. Though the remaining fragment of timeslot 9 may fit the first available space in accordance with the first tiling rule, hub 101 may further split the remaining fragment of timeslot 9 in accordance with the third tiling rule, as only a suffix of the first available space conflicts with VSAT transmission limitations. Consequently, hub 101 may tile a timeslot 9b at the beginning of the first available space (i.e. following timeslot 8b) and a remaining timeslot fragment 9c at the nearest available space in accordance with the third tiling rule.

Hub 101 may stop executing the tiling algorithm described above for an allocation period upon finishing the tiling for all entries in table 403 or upon running out of unallocated return channel capacity within said allocation period. In either case, any remaining unallocated capacity (after all entries in table 403 have been handled) or unallocated approved capacity (in case one or more entries in table 403 were not satisfied, either partly or entirely) may be returned to step 411 of algorithm 410, at least for improving capacity distribution for a next allocation period. In addition, hub 101 may allocate any remaining unallocated capacity, if exists, using any applicable free capacity distribution techniques or to enable use of contention access over said capacity.

In a further aspect of this invention and in reference to FIG. 4, a method for determining the total capacity available for distribution in step 411 is described herein.

As previously described, method 410 may strive to allocate a VSAT the most efficient timeslots type that the VSAT may be configured to transmit. Therefore, the total capacity available for distribution in step 411 of method 410 may be determined while assuming that the entire return channel may be allocated to VSATs using said most efficient timeslot type, which may be predefined or otherwise calculated based on VSAT transmission capability information.

However, occasionally one or more VSATs, which may have been distributed capacity during step 411 of method 410, may experience degradation in link conditions (e.g. due to rain fade) and may not be capable of transmitting using the most efficient timeslot type. Consequently, the actual total capacity available may be lower than estimated prior or during step 411 of method 410. As a result, in step 414 of method 410 the mapping process may be concluded due to usage of all the available return channel bandwidth while some of the capacity distributed to VSATs during step 411 of method 410 may remain unmapped.

In some embodiments of this invention, the above problem may be resolved by updating the pending capacity requests of the relevant VSATs in accordance with the unmapped distributed capacity (i.e. returning the remaining unmapped capacity back to the demand stage). Consequently, for a next allocation period, these VSATs may present greater capacity requests, which may result in selection of different timeslot types in step 412 of method 410. Since mapping in step 414 of method 410 is performed after sorting the distributed capacity in accordance to timeslot types, these VSATs may be mapped before other VSATs in a next allocation period. As a result, a fairness behavior may be presented, so that no VSAT remains starved for a long period of time.

In other embodiments of this invention, the total capacity available for a next allocation period may be calculated as described above but for distribution purposes the unmapped distributed capacity from the current allocation period may be deducted from said total capacity available. In addition, the unmapped distributed capacity from the current allocation period may be mapped first in a next allocation period for at least the purpose of minimizing allocation delay for the relevant VSATs.

In yet other embodiments of this invention, the calculation of the total capacity available for a next allocation period may include a step of determining a volume of either unmapped distributed capacity or a remaining unallocated capacity from a current allocation period. Said volume may be represented by a negative number in case of unmapped distributed capacity or by a positive number in case of remaining unallocated capacity. In order to determine the total capacity available for a current allocation period, the determined volume may be added to the total capacity available calculated for the previous allocation period and the result may be truncated if exceeding the maximal total capacity available considering the most efficient timeslot type. Such feedback may be used at least for the purpose of minimizing unmapped distributed capacity and monitoring changes in total network throughput. In addition, this method may be combined with the previous one. After calculating the total capacity available in a current allocation period in accordance with this method, unmapped distributed capacity leftovers from the previous allocation period may be immediately mapped and their volume deducted from the total available capacity for distribution in the current allocation period.

In yet further embodiments, delaying some distributed capacity to a next allocation period due to at least capacity considerations may take place as part of step 412 of algorithm 410, i.e. while tables 401 and 402a are sorted in accordance with the order of capacity distribution as may be determined by any quality-of-service algorithms prior to invoking algorithm 410. This method may be used in order to guarantee jitter performance. FIG. 5 shows a flow chart, which may be an enhancement of flow chart of FIG. 2 and correspond to step 412 in FIG. 4, further including steps for delaying some distributed capacity to a next allocation period due to at least capacity considerations.

The allocation period duration and the return channel bandwidth may be predefined and therefore known at all times. A figure representing the total allocation area (ALLOC$_T$) may be calculated as the multiplication of both said numbers, i.e. the allocation period duration and the return channel bandwidth (step 501). Furthermore, for each timeslot type, a figure representing an allocation area per capacity unit may be determined based on the timeslot type characteristics (including but not limited to a symbol rate characteristic, a modulation characteristic, a coding characteristic and a shaping filter characteristic). The capacity unit used may be selected in accordance with a method used for fitting distributed capacity into actual timeslot instances, as previously described, for at least the purpose of simplifying the calculation of an allocation area required for each distributed capacity. Once calculated, the allocation area required for each distributed capacity (BW$_J$) may be recorded, for example using an additional column in table 402a (not shown in either FIG. 4 or FIG. 5).

In some embodiments, wherein a distributed capacity may be fitted into a single timeslot, the capacity unit may be quite small (e.g. 1 byte) for at least the purpose of insuring an accurate calculation. The allocation area required for a distributed capacity instance may be calculated as the allocation area figure for the selected timeslot type times the distributed capacity expressed using the selected capacity unit (e.g. in bytes), plus perhaps a constant predetermined overhead (e.g. in order to account for timeslot overheads, for example guards, preamble, etc). In other embodiments, wherein distributed capacity may be fitted into one or more fixed length timeslots, the capacity unit used for an allocation area figure may equal that of a single timeslot instance. The allocation area required for a distributed capacity may be calculated as the allocation area figure for the selected timeslot type times the number of said fixed length timeslots required for fitting the approved capacity.

With the allocation area corresponding to each distributed capacity instance being recorded, e.g. in table 402a, an aggregated allocation area required for the distributed capacity instances in table 402a may be calculated and compared to the total allocation area figure, which may be calculated as previously described. In some embodiments, said comparison may be performed as part of step 412 (for example between steps 219 and 220, as shown in FIG. 5). After determining the most efficient timeslot type for a distributed capacity instance (steps 218 and 219), the allocation area required for said distributed capacity instance (BW$_J$) may be calculated as described above (step 502) and then added to an allocation area accumulator (BW$_T$), which may be zeroed at the beginning of each allocation period (step 501) and updated with every distributed capacity instance being handled (step 502). If the accumulator exceeds the total allocation area figure (step 503), the execution of step 412 may be immediately terminated. The distributed capacity instance causing said exceeding and all remaining distributed capacity instances in table 402a not yet assigned a most suitable timeslot type may be purged from table 402a for the current allocation period (step 504). In addition, all entries in table 401 may be purged but the entries corresponding to the distributed capacity instance causing said exceeding and the entries corresponding to the remaining distributed capacity instances not yet assigned a most suitable timeslot type. The entries not purged from table 401 may remain in table 401 and occupy the first entries in the table for the next allocation period. The remaining entries may be ordered in the same order as existed between them prior to reorganizing table 401 (step 504). In some embodiments (not shown in FIG. 5), if the accumulator exceeds the total allocation area figure, the remaining distributed capacity instances in table 402a not yet assigned a most suitable timeslot type may be examined in order to determine whether any one or more of them may be allocated the remaining allocation area. If one or more of the remaining distributed capacity instances may be allocated the remaining allocation area, their most suitable timeslot type may be determined and they may remain in table 402a for processing in step 413, while all the other remaining distributed capacity instances in table 402a not yet assigned a most suitable timeslot type may be purged from table 402a and placed in table 401 as described above.

In satellite communication system 100, hub 101 and VSATs 110 may be configured to communicate via satellite 102. Said communication may take place over a predefined space segment characterized by at least a predefined bandwidth and a predefined transmission power limit. As the satellite's total bandwidth and total transmission power are known (e.g. per transponder), it is possible to determine a relative portion or a ratio of bandwidth and a relative portion or a ratio of transmission power that may be used by satellite communication system 100. The ratio between the two said power and bandwidth ratios is known as Power over Bandwidth (P/B). Since the price paid for the space segment that may be used by satellite communication system 100 may be determined in accordance with the higher of the two said relative portions or ratios, a design goal for satellite communication system 100 may be to balance power and bandwidth requirements, i.e. to have a P/B ratio as close to 1 as possible.

If satellite communication system 100 were to employ a static access scheme, where a time-frequency map may be used, the return channel would have a static composition of transmission channels and timeslot types (i.e. modulation and coding characteristics). Consequently, any predefined total transmission power limit could have been maintained at any given point in time while any allocation algorithms that may have been used by satellite communication system 100 with such a static access scheme might be unconcerned of maintaining a total transmission power limit in real-time. However, satellite communication system 100 may be configured to use method 410, i.e. to allocate timeslots to VSATs in real time without a reference to a predefined time-frequency map. Considering method 410 as previously described, it might not be possible to determine a total transmission power limit in advance. While bandwidth is constant and known in advance, the total power consumed from the satellite over that bandwidth may vary in accordance with the timeslot types associated with VSATs, which may be allocated that bandwidth. The power consumed from the satellite becomes higher as modulations and coding become more efficient (i.e. there are more user bits per transmitted symbol), since such modulations and coding require higher signal to noise ratio.

Each VSAT may be configured to have transmission power for transmitting a predetermined information rate using a predetermined first timeslot type (e.g. using predetermined symbol rate, modulation and coding characteristics). However, at times a VSAT may transmit less information at a rate lower than the predetermined information rate. At such times, the VSAT's transmission power may be sufficient for transmitting using a second timeslot types of lower symbol rate characteristic and more efficient modulation and coding characteristics, which may require higher signal to noise ratio (e.g. $E_S/N_0$ or SNR) than the signal to noise ratio that may be required for the predetermined first timeslot type. Therefore, in a first case of many VSATs each transmitting low rate or low volume of traffic at high efficiency (e.g. high SNR), the total power consumed from the satellite may be much higher compared to a second case of few VSATs each transmitting high volume at lower efficiency (e.g. lower SNR). On one hand, assuming a high power over bandwidth (P/B) ratio (e.g. considerably higher than 1) in order to support the first case described above may be very expensive and unjustified for at least some of the time. On the other hand, method 410, as previously described, does not include any steps for at least the purpose of insuring that the total transmission power limit (and therefore the predefined P/B ratio as well) do not exceed any predefined limit.

In yet a further aspect of this invention, method 410 of FIG. 4, for allocating timeslots to VSATs in real time, without a reference to a predefined time-frequency map and over an allocation period, may further comprise steps for monitoring and/or enforcing a predefined total power or total energy limit. In some embodiments, the return channel bandwidth may be divided into two or more non-contiguous sections, over one or more satellite transponders. The method described herein may be exercised for each such section and/or for each transponder separately, as the perhaps power or energy limitations may vary from one section to another and/or from one transponder to another.

Hub 101 may be configured to determine the total power available over the return channel bandwidth ($P_T$). In some embodiments, hub 101 may be configured to calculate the total power available over the return channel bandwidth based on a parameter representing a maximal $E_S/N_0$ for a signal occupying the entire return channel bandwidth. Where the total power available over the return channel bandwidth is represented using another method, hub 101 may be configured to use parameters of the satellite and/or link budget calculations in order to normalize the given number to represent a maximal $E_S/N_0$ for a signal occupying the entire return channel bandwidth. Hub 101 may then calculate the total power available over the return channel bandwidth ($P_T$) by multiplying the maximal $E_S/N_0$ figure (as described above) by the return channel bandwidth.

FIG. 6 shows return channel bandwidth 600. Hub 101 may be further configured to logically divide allocation period 610 into k time slices of uniform duration. The start of the first time slice may correspond to the start of allocation period 610 and the end of the k-th time slice may correspond to the end of allocation period 610. Since the duration of allocation period 610 may be predefined, the number of logical time slices per allocation period (k) may be predefined as well. In some embodiments, hub 101 may be configured to set the number of logical time slices per allocation period so that each time slice is not longer than the shortest timeslot that may be allocated to a VSAT under method 410 as described above, for at least the purpose of providing sufficient resolution.

Furthermore, hub 101 may be configured to use vector 630 having k entries, wherein each entry in vector 630 represents a corresponding logical time slice within allocation period 610, for at least the purpose of calculating aggregated power during each of the corresponding logical time-slices. The calculation of aggregated power may be combined into the tiling algorithm as described herein.

As described above, in step 412 of algorithm 410 the hub may be configured to determine a most suitable timeslot type for each VSAT which may have been distributed capacity within an allocation period. Hub 101 may be further configured to determine a power figure for each such determined most suitable timeslot type and to record that information as part of the timeslot type parameters, for example using another column in table 402b (not shown). Hub 101 may determine a power figure for a timeslot type by multiplying an $E_S/N_0$ figure corresponding to a timeslot type by the bandwidth said timeslot type is expected to occupy, in accordance with the characteristics of the timeslot type (e.g. a modulation and a coding characteristics, a symbol rate characteristic, a shaping filter characteristic, etc).

Furthermore, upon tiling a timeslot in accordance with the three tiling rules described above, hub 101 may determine the one or more logical time slices (m), which the tiled timeslot may span over given its allocation parameters (e.g. a start time and a stop time) as per the results of the tiling process. For example (referring to FIG. 6), timeslot 651 spans over slices 1 and 2, while timeslot 654 spans over slices k–4 to k. Hub 101 may then update the respective m entries in the said vector by adding to each of the m entries the power figure corresponding to the timeslot type, which corresponds to the tiled timeslot. For example, after tiling timeslot 658b, the first entry in vector 630 ($P_1$) may represent the total power required by timeslots 651, 655 and 658b, and the second entry ($P_2$) may represent the total power required for timeslots 655, 658b and either 651 or 652 (the one having the highest power figure), since both timeslots 651 and 652 partly span the second slice. Hub 101 may then determine whether any of the updated entries in vector 630 exceeds the previously determined total power available over the return channel bandwidth ($P_T$). If none of the entries exceeds $P_T$, then the last tiled timeslot is properly allocated and hub 101 may continue with tiling the next timeslot. However, if one or more of the updated entries exceeds $P_T$, hub 101 may be configured to temporarily mark one or more intervals corresponding to one or more time slices corresponding to said one or more updated entries exceeding $P_T$ as invalid for allocating said timeslot (not shown in FIG. 6). Hub 101 may then remove the tiled timeslot from allocation, update the respective entries in the vector and retry tiling the timeslot while considering the new power limitations in a similar manner to the other limitations as described in reference to the third tiling rule. This procedure may be repeated one or more times until a proper allocation is found or until hub 101 determines that the timeslot may not be allocated anywhere within the allocation period in accordance with the tiling rules. Upon determining that a timeslot may not be allocated, hub 101 may be configured to treat the timeslot as unallocated approved capacity and return it to step 411 of algorithm 410.

In yet another aspect of this invention, delaying some distributed capacity to a next allocation period due to at least satellite power considerations may take place as part of step 412 of algorithm 410, i.e. while tables 401 and 402a are sorted in accordance with the order of capacity distribution as may be determined by any quality-of-service (QoS) algorithms prior to invoking algorithm 410. This method may be used in order to guarantee jitter performance. In some embodiments, the return channel bandwidth may be divided into two or more non-contiguous sections, over one or more satellite transponders. The method described herein may be exercised for each such section and/or for each transponder separately, as the perhaps limiting P/B ratio may vary from one section to another and/or from one transponder to another.

Hub 101 may be configured to determine the total energy available over the return channel bandwidth over the entire allocation period ($W_T$). In some embodiments, hub 101 may be configured to calculate the total energy available based on a parameter representing a maximal $E_S/N_0$ for a signal occupying the entire return channel bandwidth for the entire duration of the allocation period. Where the total energy available over the return channel bandwidth over the entire allocation period is represented using another method, hub 101 may be configured to use parameters of the satellite and/or link budget calculations in order to normalize the given number to represent a maximal $E_S/N_0$ for a signal occupying the entire return channel bandwidth over the entire allocation period. Hub 101 may then calculate the total energy available over the return channel bandwidth over the entire allocation period ($W_T$) by multiplying the maximal $E_S/N_0$ figure (as described above) by the known return channel bandwidth and by the predefined allocation period.

As described above, in step 412 of algorithm 410, hub 101 may be configured to determine a most suitable timeslot type for each VSAT which may have been distributed capacity within an allocation period. This step involves the creation of table 402b, as previously described, listing all chosen timeslot types.

Hub 101 may be further configured to create another table, in addition to creating table 402b, as shown in FIG. 7 (table 701). For each combination of a modulation characteristic and a coding characteristic (referred to herein as MODCOD, e.g. QPSK 3/4, 8PSK 2/3, etc), which may be used in one or more timeslot types recorded in table 402b, hub 101 may be configured to record the MODCOD in table 701 (e.g. at least the modulation characteristic and the coding characteristic). For each MODCOD recorded in table 701, hub 101 may be further configured to calculate a spectral efficiency figure (e.g. in terms of bits per Hertz (B/Hz)) and determine a minimal SNR figure (e.g. in terms of $E_S/N_0$) for proper reception of a timeslot type using said MODCOD. Hub 101 may be configured to create table 702 by sorting table 701 in a descending order of SNR figures and then calculate the relative decrease in power and the relative decrease in capacity between every two adjacent entries in table 702 (but the last entry, which has no following adjacent entry). Except for the last entry (i.e. having the lowest SNR), for each entry in the table 702 hub 101 may calculate and/or record the power change ratio over the capacity change ratio, for example by dividing the previously calculated power decrease ratio by the previously calculated capacity decrease ratio. Hub 101 may then copy table 702 to table 703 and sort table 703 in ascending order of the calculated power change over capacity change ratio. The resulting table 703 may list in its first entry a MODCOD, which if replaced by a following MODCOD in table 702, has the highest (i.e. the best) ratio between a decrement in required energy relative to a resulting decrement in spectral efficiency. In the same manner, a MODCOD in a given entry of table 703 may have a higher (i.e. better) ratio between a decrement in required energy relative to a resulting decrement in spectral efficiency than all MODCODs listed in table 703 after said MODOCD.

The process described above, of creating tables 702 and 703, may be repeated whenever a new timeslot type is added to table 402b. However, in some embodiments, where the number of MODCOD combinations is limited and known in advance, tables 702 and 703 may be created once (e.g. during an initialization stage, which may also include the calculation of the total energy available ($W_T$)), for at least the purpose of reducing real-time processing.

As described above, in step 412 of algorithm 410 the hub may be configured to determine a most suitable timeslot type for each VSAT which may have been distributed capacity within an allocation period. FIG. 8 shows a flow chart, which may be an enhancement of the flow chart of FIG. 5 and may correspond to step 412 in FIG. 4, further including steps for delaying some distributed capacity to a next allocation period due to at least satellite power considerations.

For each entry in table 402a, hub 101 may be configured to determine an energy figure corresponding to the energy required for transmitting the approved capacity ($B_a$) using the selected most efficient timeslot type, and to record that information as part of the timeslot type parameters, for example using another column in table 402a (not shown in either FIG. 4 or FIG. 7). Hub 101 may determine said energy figure by multiplying an $E_S/N_0$ figure corresponding to a timeslot type by the bandwidth said timeslot type is expected to occupy and by the duration required for transmitting an approved capacity ($B_a$) using said timeslot type. Hub 101 may be further configured to aggregate energy figures ($E_T$) as entries are inserted to table 402a (step 802). After each entry being inserted, Hub 101 may compare the aggregated energy figure ($E_T$) with the total energy available figure ($W_T$). If the aggregated energy figure ($E_T$) does not exceed the total energy available figure ($W_T$), hub 101 may be configured to continue with executing the algorithm of step 412 as previously described. If the aggregated energy figure ($E_T$) exceeds the total energy available figure ($W_T$), hub 101 may be configured to balance power over bandwidth using the algorithm described herein prior to concluding step 412 (step 804).

Again referring to FIG. 7, starting from the first entry in table 703, hub 101 may search entries in table 402a matching said entry of table 703. An entry of table 402a may match an entry of table 703 if the timeslot type corresponding to the entry of table 402a has the same modulation and coding characteristics as a first MODCOD in the entry of table 703. In addition, hub 101 may determine a substitute MODCOD for the first MODCOD in the entry of table 703, wherein the substitute MODCOD is the one following the first MODCOD in table 702. For each matching entry in table 402a, hub 101 may be configured to replace the corresponding timeslot type with a timeslot type having the same modulation and coding characteristics as the substitute MODCOD and to adjust other characteristics of the timeslot type (for example a symbol rate characteristic) as previously described (for example in a similar manner to steps 212 to 218 in FIG. 8). If necessary, hub 101 may be configured to modify table 402b to match the changes made in table 402a. With each entry being changed, hub 101 may be configured to recalculate the aggregated energy figure ($E_T$) and to stop the substitution process described above if the aggregated energy figure ($E_T$) no longer exceeds the total energy available figure ($W_T$). Furthermore, if no matching entries in table 402a are found to the first entry in table 703, and/or if all matching entries in table 402a are substituted but the aggregated energy figure ($E_T$) still exceeds the total energy available figure ($W_T$), hub 101 may be configured to use the next entry in table 703 and repeat the above described algorithm. If all entries in table 703 are exhausted (i.e. all possible substitutions were made) and the aggregated energy figure ($E_T$) still exceeds the total energy available figure ($W_T$), or if no more substitutions are possible due to exceeding an allocation area figure as previously described (step 805), the entry causing said exceeding and all remaining entries in table 402a not yet assigned a most suitable timeslot type may be purged from table 402a for the current allocation period (step 504). In addition, all entries in table 401 may be purged but the entries corresponding to the entry in table 402a causing said exceeding and the entries corresponding to the remaining entries in table 402a not yet assigned a most suitable timeslot type. The entries not purged from table 401 may remain in table 401 and occupy the first entries in the table for the next allocation period. The remaining entries may be ordered in the same order as existed between them prior to reorganizing table 401.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A method of allocating timeslots to remote terminals in a satellite communication system, the method comprising the following steps:
   determining a total capacity available for distribution within an allocation period, wherein the allocation period is a predefined interval;
   distributing said total capacity over pending requests from a plurality of remote terminals using applicable quality of service algorithms and determining approved transmission capacities for each of the plurality of remote terminals during said allocation period;
   determining a suitable timeslot type for each of the plurality of remote terminals with an approved transmission capacity, based on its approved transmission capacity and its transmission power capability and without reference to a predefined time-frequency map, and associating each of the plurality of remote terminals with its respective determined timeslot type, wherein a timeslot type comprises at least a symbol rate characteristic, a modulation characteristic and a coding characteristic, and wherein a transmission power capability of a remote terminal corresponds to a maximal reception level at a hub corresponding to the remote terminal's maximal transmission power level; and
   mapping an approved transmission capacity distributed to each of the plurality of remote terminals onto return channel bandwidth using a suitable timeslot type in accordance with said suitable timeslot type determination,
   wherein the step of determining a suitable timeslot type for each of the plurality of remote terminals with an approved transmission capacity comprises the following steps:
      determining a transmission power capability for a first remote terminal in the plurality of remote terminals, wherein a transmission power capability of the first remote terminal corresponds to a maximal reception level at the hub corresponding to the first remote terminal's maximal transmission power level;
      determining a symbol rate in accordance with an approved transmission capacity for the first remote terminal using modulation and coding characteristics, which the first remote terminal is configured to transmit given no transmission power capability limitation;
      rounding up said symbol rate to a nearest linear combination of a set of predefined symbol rates to produce a minimal symbol rate;
      determining a first timeslot type corresponding to said transmission power capability and said minimal symbol rate, wherein said first timeslot type includes at least a modulation characteristic, a coding characteristic and a symbol rate characteristic corresponding to said minimal symbol rate;
      calculating a maximal capacity transmittable by the first remote terminal during an allocation period using said first timeslot type, wherein the allocation period is a predefined interval;
      comparing said maximal capacity and the approved transmission capacity of the first remote terminal; and
      recording said first timeslot type as a suitable timeslot type for the first remote terminal in said allocation period and associating the first remote terminal with said first timeslot type in said allocation period if the calculated maximal capacity equals or exceeds the approved transmission capacity.

2. The method of claim 1, further comprising:
   determining that an approved transmission capacity of the first remote terminal exceeds a calculated maximal capacity;
   determining a next minimal symbol rate as the minimal symbol rate to be derived through linear combination from said predefined set of symbol rates, wherein the next minimal symbol rate is higher than a previously determined minimal symbol rate;
   determining a second timeslot type corresponding to said transmission power capability and said next minimal symbol rate, wherein said second timeslot type includes at least a modulation characteristic, a coding characteristic and a symbol rate characteristic corresponding to said next minimal symbol rate;
   calculating a maximal capacity transmittable by the first remote terminal during an allocation period using said second timeslot type, wherein the allocation period is a predefined interval;
   comparing said maximal capacity and the approved transmission capacity of the first remote terminal; and
   recording said second timeslot type as a suitable timeslot type for the first remote terminal in said allocation period and associating the first remote terminal with said second timeslot type in said allocation period if the calculated maximal capacity equals or exceeds the approved transmission capacity.

3. The method of claim 1, wherein the step of determining a suitable timeslot type for each of the plurality of remote terminals with an approved transmission capacity further comprises the following steps:

calculating a figure representing the total allocation area, wherein said figure is the multiplication of said predefined allocation period duration and the return channel bandwidth;

determining for each timeslot type a figure representing an allocation area per capacity unit, wherein the capacity unit is selected in accordance with a method used for fitting distributed capacity into actual timeslot instances; and determining for each distributed capacity the allocation area required for it using a figure representing an allocation area per capacity unit corresponding to a timeslot type associated with said distributed capacity.

4. The method of claim 3, further comprising the following steps:

calculating an aggregated allocation area figure;

comparing the aggregated allocation area figure with said figure representing the total allocation area, wherein said comparison is performed after determining a suitable timeslot type for a remote terminal; and determining that the aggregated allocation area figure exceeds said figure representing the total allocation area.

5. The method of claim 4, further comprising the following steps after determining that the aggregated allocation area figure exceeds said figure representing the total allocation area:

terminating the determining of suitable timeslot types to remote terminals for said allocation period; and delaying the determining of suitable timeslot types for remote terminals not yet assigned suitable timeslot types to a next allocation period, wherein the delayed instances remain ordered in accordance with an already existing capacity distribution order.

6. The method of claim 1, further comprising a step of enforcing predefined total power limit or total energy limit over the return channel bandwidth.

7. The method of claim 1, further comprising:

after determining a suitable timeslot type, sorting remote terminals and their corresponding approved transmission capacities in a descending order according to a symbol rate characteristic included in a timeslot type which a remote terminal is associated with; and performing said mapping in accordance with the order produced by said sorting.

8. The method of claim 7, wherein said sorting further comprises the following steps:

determining that two or more remote terminals are associated with timeslot types having the same symbol rate characteristic; and performing a secondary sort of said remote terminals and their corresponding approved transmission capacities in a descending order of a timeslot efficiency characteristic, wherein said secondary sort comprises calculating the timeslot efficiency characteristic based on at least a modulation characteristic and a coding characteristic included in a timeslot type.

9. The method of claim 7 wherein the step of mapping the approved transmission capacity distributed each of the plurality of remote terminals onto return channel bandwidth comprises:

receiving a list of one or more remote terminals and their corresponding approved transmission capacities for mapping, wherein each remote terminal in the list is associated with a timeslot type and the list is sorted in a descending order in accordance with a symbol rate characteristic of a timeslot type;

selecting the first entry in said list;

determining a first remote terminal from said entry and a timeslot type associated with the first remote terminal;

determining an approved transmission capacity from said first entry; and tiling said approved transmission capacity using said timeslot type at a first available space within a return channel, wherein the first available space in a return channel at an allocation period comprises an unallocated space in a plurality of unallocated spaces having a lowest frequency characteristic compared to the other of the plurality of unallocated spaces and having an earliest time characteristic compared any to the other of the plurality of unallocated spaces having the same lowest frequency characteristic.

10. The method of claim 9, further including the following steps:

selecting a second entry consecutive to the first entry in said list;

determining a second remote terminal from said second entry and a second timeslot type associated with the second remote terminal;

determining a second approved transmission capacity from said second entry; and tiling said second approved transmission capacity using said second timeslot type at a second available space within the return channel, wherein the second available space in a return channel at an allocation period comprises an unallocated space in the remaining plurality of unallocated spaces having a lowest frequency characteristic compared to the other of the remaining plurality of unallocated spaces and having an earliest time characteristic compared to the other of the remaining plurality of unallocated spaces having said same lowest frequency characteristic.

11. The method of claim 10, wherein tiling a second timeslot at an available space within a frequency range of an already tiled first timeslot is permitted only if the frequency range of said second timeslot is completely fitted into the frequency range of said first timeslot, wherein a frequency range is determined by at least a start frequency characteristic and a stop frequency characteristic.

12. The method of claim 10, further comprising the following steps:

determining an end time of a timeslot if said timeslot is to be tiled at a first available space;

determining that the end time of said timeslot exceeds the end time of an allocation period;

splitting said timeslot into two timeslot fragments;

tiling a first timeslot fragment at the first available space;

tiling a second timeslot fragment at a next available space, wherein said next available space is determined as the first available space after the first timeslot fragment is tiled; and tiling said timeslot at the first available space if the end time of said timeslot does not exceed the end time of an allocation period.

13. The method of claim 9, further comprising the following steps:

determining one or more intervals within the allocation period in which a remote terminal is not permitted to transmit a timeslot to be tiled based on at least one of a transmitting limitation at said remote terminal or a receiving limitation at a receiving remote terminal;

determining whether one or more of said determined intervals entirely overlap the first available space or entirely overlap only a suffix of the first available space;

if one or more of said determined intervals overlaps only a suffix of the first available space, splitting a timeslot and tiling a first timeslot fragment at the first available space and a second timeslot fragment at an earliest unallocated interval at a frequency range immediately following the first available space; and if one or more of said determined intervals entirely overlaps the first available space, tiling a timeslot at an earliest unallocated interval at a frequency range immediately following the first available space.

14. The method of claim 9, further including a step of fitting the approved transmission capacity of the first remote terminal into timeslot instances corresponding to a timeslot type associated with the first remote terminal prior to selecting a first entry from said list of remote terminals and their corresponding approved transmission capacities.

15. A method for mapping capacity distributed to remote terminals in a satellite communication system onto return channel bandwidth in accordance with a timeslot type associated with a remote terminal, the method comprising the following steps:

receiving a list of one or more remote terminals and their corresponding approved transmission capacities for mapping, wherein each remote terminal in the list is associated with a timeslot type and the list is sorted in a descending order in accordance with a symbol rate characteristic of a timeslot type;

selecting the first entry in said list;

determining a first remote terminal from said entry and a timeslot type associated with the first remote terminal;

determining an approved transmission capacity from said first entry;

tiling said approved transmission capacity using said timeslot type at a first available space within a return channel, wherein the first available space in a return channel at an allocation period comprises an unallocated space in a plurality of unallocated spaces having a lowest frequency characteristic compared to the other of the plurality of unallocated spaces and having an earliest time characteristic compared to the other of the plurality of unallocated spaces having the same lowest frequency characteristic;

selecting a second entry consecutive to the first entry in said list;

determining a second remote terminal from said second entry and a second timeslot type associated with the second remote terminal;

determining a second approved transmission capacity from said second entry; and tiling said second approved transmission capacity using said second timeslot type at a second available space within the return channel, wherein the second available space in a return channel at an allocation period comprises an unallocated space in the remaining plurality of unallocated spaces having a lowest frequency characteristic compared to the other of the remaining plurality of unallocated spaces and having an earliest time characteristic compared to the other of the remaining plurality of unallocated spaces having said same lowest frequency characteristic.

16. The method of claim 15, wherein tiling a second timeslot at an available space within a frequency range of an already tiled first timeslot is permitted only if the frequency range of said second timeslot is completely fitted into the frequency range of said first timeslot, wherein a frequency range is determined by at least a start frequency characteristic and a stop frequency characteristic.

17. The method of claim 15, wherein tiling of a timeslot at an available space is permitted if the end time of the timeslot does not exceed the end time of an allocation period.

18. The method of claim 17, further comprising the following steps:

determining that the end time of a timeslot exceeds the end time of an allocation period;

splitting said timeslot into two timeslot fragments;

tiling a first timeslot fragment at a first available space; and tiling a second timeslot fragment at a next available space, wherein said next available space is determined as the first available space after the first timeslot fragment is tiled.

19. The method of claim 15, further comprising the following steps:

determining one or more intervals within the allocation period in which a remote terminal is not permitted to transmit a timeslot to be tiled based on at least one of a transmitting limitation at said remote terminal or a receiving limitation at a receiving remote terminal;

determining whether one or more of said determined intervals entirely overlap the first available space or entirely overlap only a suffix of the first available space;

if one or more of said determined intervals overlaps only a suffix of the first available space, splitting a timeslot and tiling a first timeslot fragment at the first available space and a second timeslot fragment at an earliest unallocated interval at a frequency range immediately following the first available space; and if one or more of said determined intervals entirely overlaps the first available space, tiling a timeslot at an earliest unallocated interval at a frequency range immediately following the first available space.

20. The method of claim 19, wherein a transmitting limitation is derived from at least one of the group comprising: the number of signals that the first remote terminal is configured to simultaneously transmit, and a minimal interval that the first remote terminal is configured to require for changing transmission frequency.

21. The method of claim 15, further including a step of fitting the approved transmission capacity of the first remote terminal into timeslot instances corresponding to a timeslot type associated with the first remote terminal prior to selecting a first entry from said list of remote terminals and their corresponding approved transmission capacities.

22. The method of claim 21, wherein the timeslot instances are fixed length timeslots.

23. The method of claim 21, wherein the approved transmission capacity of the first remote terminal is fitted into a single timeslot instance of a variable length, and wherein none of the timeslot instances are split into multiple fragments unless mandated by a tiling algorithm.

24. An apparatus comprising:

a processor controlling at least some operations of the apparatus; and a memory storing computer executable instructions that, when executed by the apparatus, cause the apparatus to perform a method of allocating timeslots to remote terminals in a satellite communication system, in real time, said method comprising steps of:

determining a total capacity available for distribution within an allocation period, wherein the allocation period is a predefined interval;

distributing said total capacity over pending requests from a plurality of remote terminals using applicable quality of service algorithms and determining approved transmission capacities for each of the plurality of remote terminals during said allocation period;

determining a suitable timeslot type for each of the plurality of remote terminals with an approved transmission capacity, based on its approved transmission capacity and its transmission power capability and without reference to a predefined time-frequency map, and associating each of the plurality of remote terminals with the respective determined timeslot type, wherein a timeslot type comprises at least a symbol rate characteristic, a modulation characteristic and a coding characteristic, and wherein a transmission power capability of a remote terminal corresponds to a maximal reception level at a hub corresponding to the remote terminal's maximal transmission power level; and mapping an approved transmission capacity distributed to each of the plurality of remote terminals onto return channel bandwidth using a suitable timeslot type in accordance with said suitable timeslot type association, wherein the step of mapping the approved transmission capacity distributed each of the plurality of remote terminals onto return channel bandwidth comprises:

receiving a list of one or more remote terminals and their corresponding approved transmission capacities for mapping, wherein each remote terminal in the list is associated with a timeslot type and the list is sorted in a descending order in accordance with a symbol rate characteristic of a timeslot type;

selecting the first entry in said list;

determining a first remote terminal from said entry and a timeslot type associated with the first remote terminal;

determining an approved transmission capacity from said first entry; and tiling said approved transmission capacity using said timeslot type at a first available space within a return channel, wherein the first available space in a return channel at an allocation period comprises an unallocated space in a plurality of unallocated spaces having a lowest frequency characteristic compared to the other of the plurality of unallocated spaces and having an earliest time characteristic compared any to the other of the plurality of unallocated spaces having the same lowest frequency characteristic.

25. The apparatus of claim 24, wherein the step of mapping the approved transmission capacity further includes the following steps:

selecting a second entry consecutive to the first entry in said list;

determining a second remote terminal from said second entry and a second timeslot type associated with the second remote terminal;

determining a second approved transmission capacity from said second entry; and tiling said second approved transmission capacity using said second timeslot type at a second available space within the return channel, wherein the second available space in a return channel at an allocation period comprises an unallocated space in the remaining plurality of unallocated spaces having a lowest frequency characteristic compared to the other of the remaining plurality of unallocated spaces and having an earliest time characteristic compared to the other of the remaining plurality of unallocated spaces having said same lowest frequency characteristic.

26. The apparatus of claim 25, wherein tiling a second timeslot at an available space within a frequency range of an already tiled first timeslot is permitted only if the frequency range of said second timeslot is completely fitted into the frequency range of said first timeslot, wherein a frequency range is determined by at least a start frequency characteristic and a stop frequency characteristic.

27. The apparatus of claim 25, further performing the following steps:

determining an end time of a timeslot if said timeslot is to be tiled at a first available space;

determining that the end time of said timeslot exceeds the end time of an allocation period;

splitting said timeslot into two timeslot fragments;

tiling a first timeslot fragment at the first available space;

tiling a second timeslot fragment at a next available space, wherein said next available space is determined as the first available space after the first timeslot fragment is tiled; and tiling said timeslot at the first available space if the end time of said timeslot does not exceed the end time of an allocation period.

28. A satellite communication system, comprising a hub and plurality of remote terminals, wherein said system is configured to:

determine a total capacity available for distribution within an allocation period, wherein the allocation period is a predefined interval;

distribute said total capacity over pending requests from the plurality of remote terminals using applicable quality of service algorithms and determining approved transmission capacities for each of the plurality of remote terminals during said allocation period;

determine a suitable timeslot type for each of the plurality of remote terminals with an approved transmission capacity, based on its approved transmission capacity and its transmission power capability and without reference to a predefined time-frequency map, and associating each of the plurality of remote terminals with the respective determined timeslot type, wherein a timeslot type comprises at least a symbol rate characteristic, a modulation characteristic and a coding characteristic, and wherein a transmission power capability of a remote terminal corresponds to a maximal reception level at the hub corresponding to the remote terminal's maximal transmission power level; and map an approved transmission capacity distributed to each of the plurality of remote terminals onto return channel bandwidth using a suitable timeslot type in accordance with said suitable timeslot type association, wherein determining a suitable timeslot type for each of the plurality of remote terminals with an approved transmission capacity comprises:

determining a transmission power capability for a first remote terminal in the plurality of remote terminals, wherein a transmission power capability of the first remote terminal corresponds to a maximal reception level at the hub corresponding to the first remote terminal's maximal transmission power level;

determining a symbol rate in accordance with an approved transmission capacity for the first remote terminal using modulation and coding characteristics, which the first remote terminal is configured to transmit given no transmission power capability limitation;

rounding up said symbol rate to a nearest linear combination of a set of predefined symbol rates to produce a minimal symbol rate;

determining a first timeslot type corresponding to said transmission power capability and said minimal symbol rate, wherein said first timeslot type includes at least a modulation characteristic, a coding characteristic and a symbol rate characteristic corresponding to said minimal symbol rate;

calculating a maximal capacity transmittable by the first remote terminal during an allocation period using said first timeslot type, wherein the allocation period is a predefined interval;

comparing said maximal capacity and the approved transmission capacity of the first remote terminal; and recording said first timeslot type as a suitable timeslot type for the first remote terminal in said allocation period and associating the first remote terminal with said first timeslot type in said allocation period if the calculated maximal capacity equals or exceeds the approved transmission capacity.

\* \* \* \* \*